Figure 1:
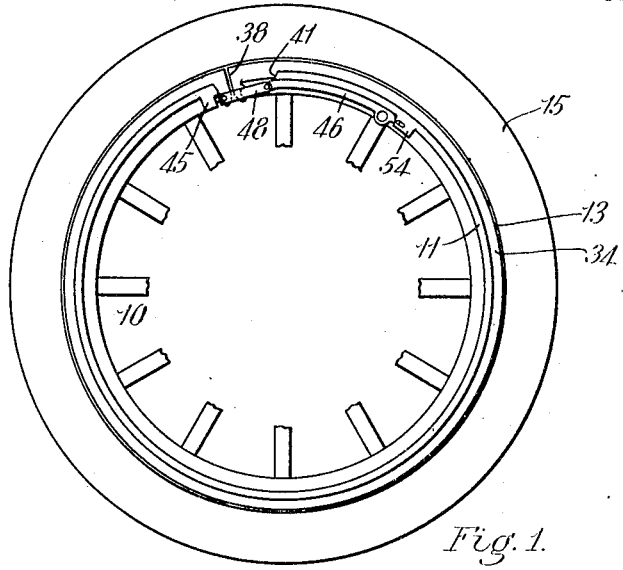

F. R. BARKER.
WHEEL RIM.
APPLICATION FILED MAR. 21, 1911.

1,020,678.

Patented Mar. 19, 1912
2 SHEETS—SHEET 1.

Witnesses:
Leonard A. Powell
Sydney E. Taft

Inventor:
Frederic R. Barker,
by his attorney, Charles S. Gooding

F. R. BARKER.
WHEEL RIM.
APPLICATION FILED MAR. 21, 1911.

1,020,678.

Patented Mar. 19, 1912.

2 SHEETS—SHEET 2.

Witnesses:
Leonard A. Powell.
Sydney E. Taft.

Inventor:
Frederic R. Barker,
by his attorney,
Charles S. Goodwin.

UNITED STATES PATENT OFFICE.

FREDERIC RUTHERFORD BARKER, OF BOSTON, MASSACHUSETTS.

WHEEL-RIM.

1,020,678.

Specification of Letters Patent.

Patented Mar. 19, 1912.

Application filed March 21, 1911. Serial No. 615,916.

*To all whom it may concern:*

Be it known that I, FREDERIC RUTHERFORD BARKER, a subject of King George V of England, residing at Boston, in the county of Suffolk and State of Massachusetts, have invented new and useful Improvements in Wheel-Rims, of which the following is a specification.

This invention relates to improvements in wheel rims and particularly rims intended for use in connection with pneumatic tires. There are now in use two types of rims, one known as demountable rims and the other as quick-detachable rims, although the latter might be more appropriately called divisible rims, since the rim proper is permanently secured to the felly of the wheel and is provided with a detachable bead which facilitates the removal of the tire from the rim. In the use of demountable rims, it is customary to have one or more spare rims with ready inflated tires thereon so that in case of a puncture or other injury to one of the tires in use on the vehicle, the injured tire with its rim may be removed and replaced by another demountable rim and ready inflated tire.

One of the objects of my invention is to provide a wheel rim which shall have the advantages of both types of rims heretofore employed. In other words, the object is to provide a rim so constructed and arranged that in case a tire should become punctured or otherwise injured, the tire may be removed together with its demountable rim from the permanent rim and replaced by another demountable rim and ready inflated tire, or, if desired, the demountable rim may be taken apart to permit the tire to be removed, repaired and replaced thereon with great facility. This object is attained by providing a permanent rim and a demountable rim mounted thereon and consisting of a plurality of rings, means to secure these rings to each other, and means to secure the demountable rim to the permanent rim. Since the parts of the demountable rim are normally locked to each other, the tire may be inflated upon the demountable rim when the same is off of the permanent rim which, of course, would be impossible if the parts were not so locked to each other for the reason that the internal pressure of the tire would force the parts of the rim away from each other.

Still other objects and advantages will appear hereinafter.

To these ends, my invention consists in the novel features of construction and in the combination and arrangement of parts set forth in the following specification and particularly pointed out in the claims.

Figure 2:
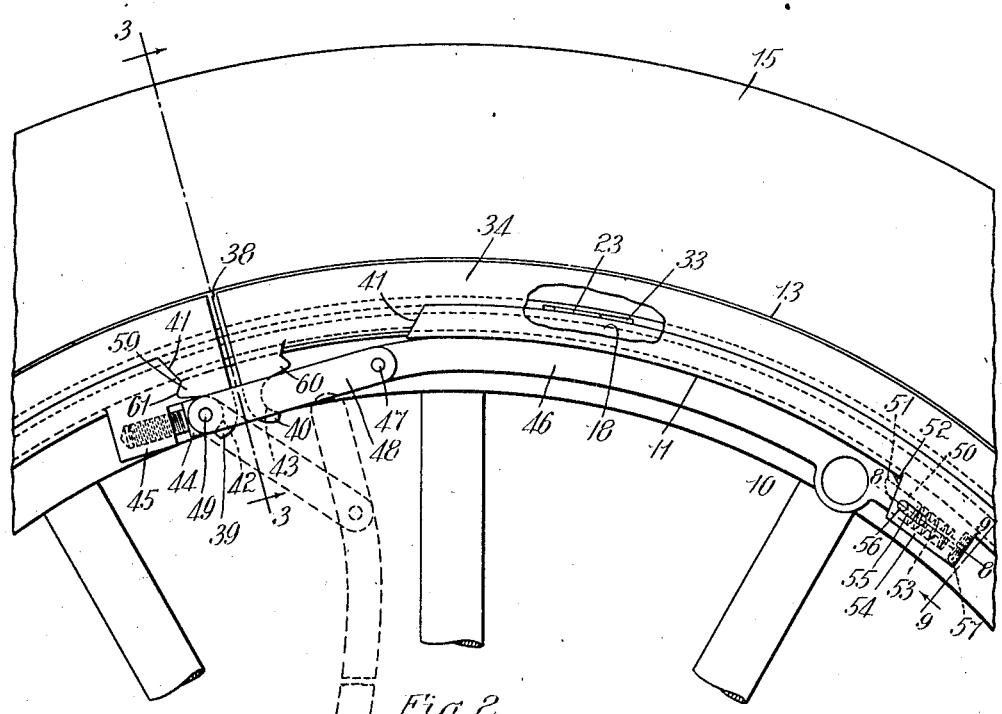
Figure 3:
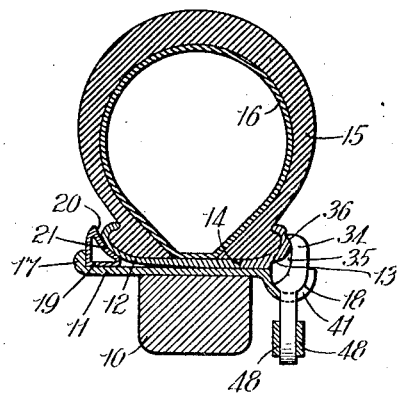
Figure 4:
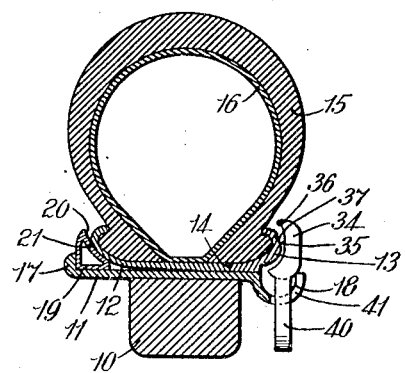
Figure 5:
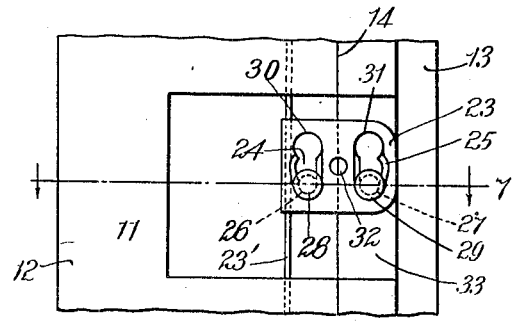
Figure 7:
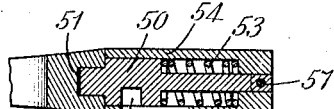
Figure 6:
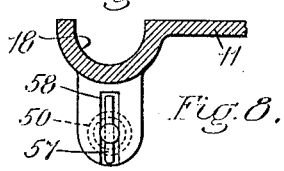
Figure 8:
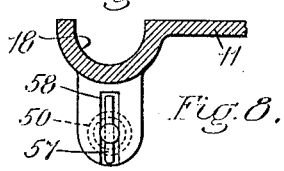

Referring to the drawings: Figure 1 is a side elevation of a rim containing my invention, in connection with a wheel and tire. Fig. 2 is an enlarged detail side elevation of a portion of the rim, tire and wheel, showing the means for securing the demountable rim to the permanent rim. Fig. 3 is a sectional view taken on line 3—3 of Fig. 2, looking toward the right, showing in place upon the permanent rim a divisible demountable rim. Fig. 4 is a sectional view similar to Fig. 3, showing the retaining ring in expanded position preparatory to removing the same. Fig. 5 is an enlarged detail view of the inner circumferential surface of the divisible demountable rim illustrating the means for attaching the two parts of the rim to each other. Fig. 6 is a sectional view taken on line 7—7 of Fig. 5. Fig. 7 is an enlarged detail sectional view taken on line 8—8 of Fig. 2. Fig. 8 is an enlarged detail sectional view taken on line 9—9 of Fig. 2, looking toward the left.

Like numerals refer to like parts throughout the several views of the drawings.

In the drawings, 10 is a wheel which may be of any usual or desired construction having secured to its periphery a rim 11 which will be referred to as the permanent rim, since it remains attached to the wheel. Mounted upon this permanent rim is a demountable rim which is composed of a plurality of rings, as shown in Figs. 3, 4, 5 and 6, the number of parts in the present instance being two designated by the numerals 12 and 13, respectively, and abutting against each other at 14. These two parts when placed together are preferably of substantially the same form and dimensions as a standard rim for a tire 15 of the clencher type, which is provided with a usual inner tube 16.

The permanent rim 11 is provided at one side with a shoulder 17 consisting of a circumferential flange and at its other side is provided with a circumferential groove 18. The flange 17 forms an abutment for a ring 19 having a laterally inclined outer circumferential surface 20 against which an inner laterally inclined circumferential surface 21 of the ring 12 of the demountable rim rests. The ring 19 is made separate from the permanent rim 11 so as to be capable of being removed and reversed.

The demountable rim, as before stated, consists of two rings 12 and 13. These rings are provided with suitable means to lock them to each other consisting of a plurality of plates 23, (see Figs. 2, 5 and 6), each of which is provided with a pair of slots 24 and 25 to receive projections 26 and 27 provided on the rings 12 and 13, respectively, these projections preferably consisting of studs provided with heads 28 and 29 which are larger in diameter than the width of the straight portions of the slots in which they are respectively located and said slots are provided with enlarged portions 30 and 31, respectively, which are of such size as to permit the plate 23 to be disconnected from the studs by sliding the same along a wire 23′ fast to the ring 12 from the position shown in Fig. 5 into such a position that the heads of the studs will register with the enlarged portions of the slots. The slots 24 and 25, it will be observed, are tapered or, in other words, they are gradually widened from their smaller ends toward their enlarged portions 30 and 31 and it will be noted that the widening of the slots occurs on their outer edges, that is to say, it does not occur on the edges which are adjacent to each other. The purpose of this widening of the slots is to provide a means whereby after the parts have been assembled, as shown in Figs. 6 and 7, and the demountable rim has been applied to the permanent rim, the vibration and the strain of the parts will cause the plates 23 to slide along until the studs 26 and 27 occupy the widened portions of the slots 24 and 25, thus permitting the pressure of the inflated tire to act to press the ring 13 against the retaining ring 34 and the ring 12 against the ring 20. Hence, since the air pressure of the tire is exerted against the sides of the permanent rim, the tire has a gripping or clenching action which holds it to the rim after the manner of the well known clencher tire. A wire 23′, it will be understood, is provided for each of the plates 23 and constitutes a pivot for each of said plates, respectively, to swing upon. The plates being slidably and pivotally mounted upon the pivots 23′, are thus attached to one of the rings, as 12, so that the same cannot be lost when the plates are unlocked from the studs.

Each of the plates 23 is preferably provided with a hole or depression 32 for the insertion of a suitable tool, not shown, whereby the plate may be easily moved one way or the other. The rings 12 and 13 are preferably provided with recesses 33, each of which is formed partly in the ring 12 and partly in the ring 13 and designed to receive the plates 23, each of these recesses being of such extent as to allow the plates to be moved to and fro to lock and unlock the same. It will be understood that the plates just described normally lock the rings 12 and 13 of the demountable rim to each other, so that the tire may be inflated when the demountable rim is off of the permanent rim. These plates, however, may be easily and quickly unlocked from the studs 26, 27 by sliding them along the pivotal wires 23′, as hereinbefore described, and the rings 12 and 13 separated from each other to facilitate the removal of the tire therefrom.

The demountable rim is normally locked in place on the permanent rim by a retaining ring 34 provided with a lateral recess 35 to receive the side of the demountable rim, this recess being provided with an inner laterally inclined circumferential surface 36 which fits against a correspondingly shaped outer circumferential surface 37 of the part 13 of the demountable rim, as shown in Fig. 3. The retaining ring 34 is expansible and contractible and to that end is interrupted or, in other words, divided or cut at 38, see Figs. 1 and 2, and is preferably so made that when released it will expand from the position shown in Fig. 3 to the position shown in Fig. 4, or, in other words, it will rise out of the groove 18 in which it is normally located.

The retaining ring 34 is provided with suitable means for changing its diameter and for this purpose the following mechanism is preferably provided. The ring 34 is provided with two lugs 39 and 40 located on opposite sides of the cut 38, said lugs extending inwardly through a suitable slot 41 provided in the permanent rim 11, see Fig. 2, this slot being preferably open along its outer side, as clearly shown in said figure. The lug 39 is preferably provided with a recess 42 and the lug 35 is preferably provided with a corresponding recess 43, the recess 42 receiving a suitable abutment preferably consisting of a stud 44 having screw-threaded engagement with a lug 45 on the permanent rim 11, so as to be capable of being adjusted to vary the force exerted by the clamping mechanism hereinbefore described. The recess 43 receives a correspondingly shaped end of a lever 46 fulcrumed on a pivot 47 upon a pair of links 48, said links being fulcrumed upon a pivot 49 upon the stud 44. The lever 46 is interposed between the links 48 and the lugs 34 and 35 are also interposed between said links.

The mechanism just described constitutes a powerful toggle which, when swung from the position shown in dotted lines in Fig. 2 to the position shown in full lines therein, will very forcibly draw the lugs 39 and 40 toward each other, thus contracting the retaining ring 34.

Preferably, the fulcrum 47, the fulcrum 49 and the end of the lever 46 engaging the lug 40 as a fulcrum all lie in a substantially straight line so that the toggle naturally tends to remain locked in its normal position. As an additional safeguard, however, there is provided a suitable spring-pressed latch 50, see Figs. 2 and 7, interengaging with the lever 46 in a suitable manner, preferably by providing said lever with a recess 51 in its end to receive said latch and preferably said lever is provided with an inclined surface 52 adjacent to and inclined toward said recess for the purpose of automatically retracting the latch when the lever is swung into its normal position, in which case the latch will ride up said incline and snap into the recess 51 under the influence of a suitable spring 53.

The latch 50 is preferably mounted to slide in a lug 54 provided on the permanent rim 11, said lug being provided with a lateral slot 55 and said latch being provided with a recess 56 which is accessible through said slot so that some suitable instrument may be inserted through said slot into said recess in order that the latch may be withdrawn from the recess 51. The latch 50, see Fig. 8, which is preferably cylindrical in form, is held against rotation by suitable means such, for example, as a cotter pin 57 located in a groove 58, this pin also serving as a means for preventing said latch from traveling too far under the influence of the spring 53.

I do not claim herein the features of the latch just described, but these features are claimed in a co-pending application filed by me February 7, 1911, Serial No. 607,195.

Referring now to Fig. 2, the lugs 39 and 40 are preferably provided with similar projections 59 and 60 and the lug 45 is provided with a correspondingly shaped recess 61 to receive the projection 59. When the demountable rim is slipped into place, the laterally inclined surface 21 of said rim engages the corresponding laterally inclined surface 20 of the ring 19 and the other side of the demountable rim is located in the recess 35 of the retaining ring 34 and when this ring is contracted, as shown in Fig. 3, the laterally inclined inner circumferential surface 36 engages the correspondingly shaped outer circumferential surface 37 of the demountable rim, thus crowding said rim forcibly toward the left against the inclined surface of the ring 19. This, of course, binds the demountable rim firmly in place.

It will be observed that when the retaining ring 34 is expanded from the position shown in Fig. 3 to the position shown in Fig. 4, the inner circumferential surface of said ring becomes substantially coincident with the outer circumferential surface of the permanent rim 11 and since the slot 41 is open at the side, said ring may then be withdrawn outwardly from its place so as to permit the removal of the demountable rim.

It will now be evident that if the tire when arranged upon the rim, as shown in Fig. 3, should become punctured or otherwise injured so that it becomes necessary to remove the same for repair, this may be accomplished by removing the retaining ring 34, as hereinbefore described, and then slipping the tire 15 with the demountable rim from their place upon the permanent rim. The two parts 12 and 13 of the demountable rim may then be unlocked and separated from each other in the manner hereinbefore described, whereupon the inner tube may be removed for repair. If, however, it be desired to substitute a ready inflated tire for the one just removed, there will be provided a demountable rim which is a duplicate of that already described, it being evident that by constructing the demountable rim in this manner the tire may be inflated thereon when the demountable rim is off of the permanent rim and it will be understood that under these circumstances it is essential that the two parts of the demountable rim shall be locked to each other so as to hold the tire when it is inflated.

Having thus described my invention, what I claim and desire by Letters Patent to secure is:

1. The combination of a permanent rim, a demountable rim composed of a plurality of rings mounted upon said permanent rim, and means to secure said rings to each other comprising a plurality of plates provided with slots extending circumferentially of said rings, and projections on said rings, respectively, located in said slots and provided with heads larger than the width of the portions of said slots in which said pins are normally located, said slots having enlarged portions through which said heads may be withdrawn, and said slots being widened along their outer edges from their smaller ends toward said enlarged portions.

2. The combination of a permanent rim, a demountable rim composed of a plurality of rings mounted upon said permanent rim and provided with a plurality of recesses formed partly in each of said rings, and means located in said recesses for securing said rings to each other, said means comprising a plurality of plates located in said recesses, respectively, and provided with slots, and projections on said rings, respectively, located in said slots, and pivots fast to one of said rings upon which said plates are pivotally and slidably mounted.

In testimony whereof I have hereunto set my hand in presence of two subscribing witnesses.

FREDERIC RUTHERFORD BARKER.

Witnesses:
CHARLES S. GOODING,
DANIEL A. ROLLINS.